United States Patent [19]

Clements et al.

[11] Patent Number: 4,596,015

[45] Date of Patent: Jun. 17, 1986

[54] FAILURE DETECTION APPARATUS FOR USE WITH DIGITAL PADS

[75] Inventors: John L. Clements; Stig E. Magnusson, both of Phoenix, Ariz.

[73] Assignee: GTE Automatic Electric Inc., Northlake, Ill.

[21] Appl. No.: 750,660

[22] Filed: Jul. 1, 1985

Related U.S. Application Data

[63] Continuation of Ser. No. 467,718, Feb. 18, 1983, abandoned.

[51] Int. Cl.⁴ ............................................. G06F 11/10
[52] U.S. Cl. .................................................... 371/51
[58] Field of Search ..................... 371/51, 49, 22, 53; 365/201

[56] References Cited

U.S. PATENT DOCUMENTS

| | | | |
|---|---|---|---|
| 3,524,163 | 8/1970 | Weiss | 371/53 |
| 3,585,378 | 5/1971 | Bouricius et al. | 371/51 |
| 3,789,204 | 1/1974 | Barlow | 371/51 |
| 4,142,243 | 2/1979 | Bishop et al. | 371/53 |
| 4,220,823 | 9/1980 | Littlefield | 370/53 |

Primary Examiner—Charles E. Atkinson
Attorney, Agent, or Firm—Frank J. Bogacz; Peter Xiarhos

[57] ABSTRACT

The present invention is an approach for verifying the operation of read only memory digital pads associated with the switching network digital switching system. Any failures are detected and an indication is transmitted for fault detection and recovery.

3 Claims, 2 Drawing Figures

FAILURE DETECTION APPARATUS FOR USE WITH DIGITAL PADS

This is a continuation of copending application Ser. No. 467,718 filed on Feb. 18, 1983 and now abandoned.

BACKGROUND OF THE INVENTION

The present invention pertains generally to digital telecommunications systems and more particularly to failure detection of digital attenuation apparatus for use in the network of such digital telecommunications systems.

In telecommunications systems, it is necessary to attenuate the signals transmitted between these systems or between a system and subscriber equipment. This operation consists of modifying the signal to be transmitted from one of the above mentioned sources to another. The modification of the signal may include attenuation or amplification. These signals to be transmitted are passed through various impedance modification devices to obtain the desired attenuation or amplification. Historically, these inpedance modification devices were implemented using discrete R-C networks.

With the advent of electronic digital switching, signal padding was accomplished with digital pads. These digital pads usually take the form of read only memory devices which are accessed via the magnitude value of the signal, used as an index to the read only memory. Such digital padding schemes are typified by U.S. Pat. No. 4,220,823, issued to B. G. Littlefield on Sept. 2, 1980.

The read only memory devices are subject to failures of input addressing leads and the output data leads. A fault in either of these two areas may produce a signal having the wrong attenuation factor.

Accordingly, it is the object of the present invention to provide failure detection apparatus for use with digital pads in a digital telecommunications system.

SUMMARY OF THE INVENTION

In a digital switching network of a digital switching system, PCM data samples are transmitted between the switching network and subcriber interface equipment through digital pads. The present invention includes failure detection apparatus for use with the digital pads.

The digital switching network is connected between the digital pads and the subscriber interface equipment. The switching network operates to produce PCM data samples for transmission to the subscriber interface equipment. Each of the PCM samples includes a number of bits representing a magnitude value of the sample, and a first parity bit representing parity over the magnitude value. A storage medium is connected between the switching network and the subscriber interface equipment and operates in response to each PCM data sample to provide a modulated magnitude value for each transmitted PCM data sample.

The storage medium includes a parity arrangement operated to produce a second parity bit representing the difference of parity between the magnitude value of the PCM data sample and the corresponding modulated magnitude value. A gating circuit is connected to the switching network and the parity arrangement. The gating circuit is operated in response to the first and second parity bits to produce a third parity bit over the PCM data sample, including the modulated magnitude value.

Parity checking circuitry is connected to the switching network, the subscriber interface equipment, the storage medium and to the gating circuit. The parity checking circuitry calculates the correct parity over each of the PCM data samples transmitted from the switching network. These PCM data samples include the modulated magnitude values. Next, the parity checking circuitry compares the calculated parity with the third parity bit. The parity checking circuitry then generates a signal for any miscomparison of the two parity bits.

DESCRIPTION OF THE PREFERRED EMBODIMENT

Figure 1:
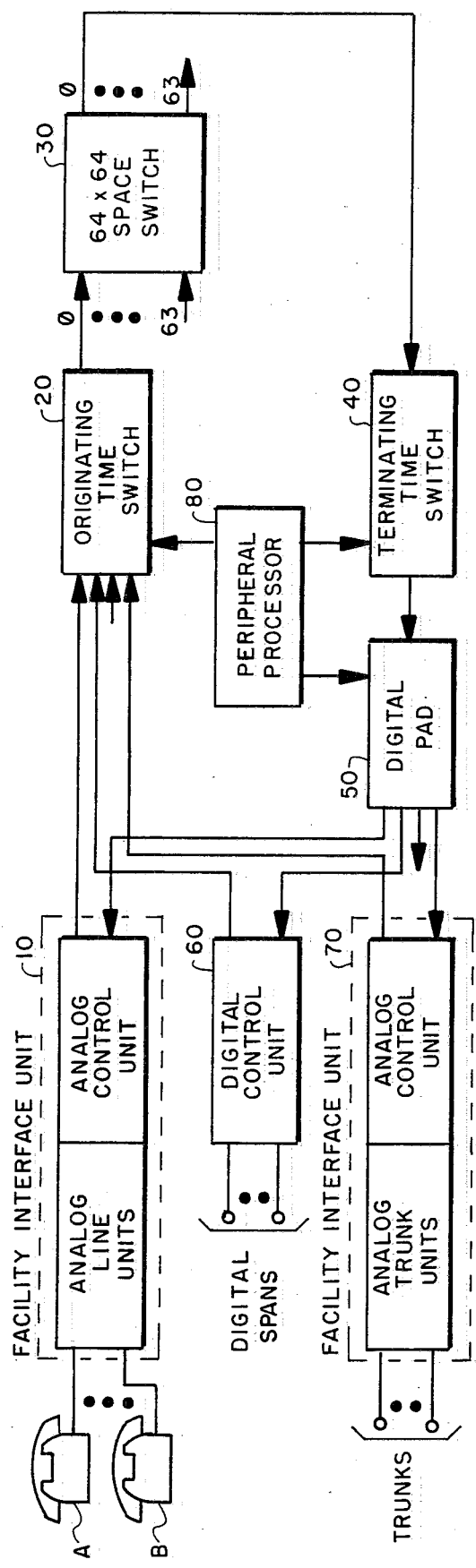
FIG. 1 is a block diagram of a network of a digital switching system.

FIG. 1 is a block diagram of the network of the GTD-5 EAX digital switching office. Subscriber A is connected to the switching network via analog facility interface unit (FIU) 10. The network is a digital switching network and may contain from 1 to 64 time and control units (TCUs). Each TCU has two time switching stages associated with it, an originating time stage and a terminating time stage. Thereby, a connection is established from subscriber A through FIU 10 to the originating time switch 20 of a particular TCU.

A connection is established from the originating time switch 20 to the 64×64 space switch 30. Then, a connection is established between space switch 30 and terminating time switch 40 of a particular TCU. The control of the connection operations outlined above is performed by peripheral processor 80.

Next, a connection is established from the terminating time switch 40 through the digital pad 50, which selectively attenuates the transmitted signal, to one of a number of outgoing FIUs. These FIUs may be an analog line FIU 10 for connection to subscriber B, a digital control unit FIU 60 for transmission via digital spans, or an analog trunk FIU 70 for transmission via trunk circuits. As a result, a voice path would be established from subscriber A through the switching network to either subscriber B, to a digital span or to a trunk circuit. In similar fashion, another path will be established for the voice to subscriber A through the switching network.

Each of the analog FIUs converts incoming voice signals to PCM signals for transmission through the network. The sampling rate of the FIU is 8,000 samples per second or one sample every 125 microseconds. Each analog FIU has a capacity of 193 channels. Each FIU time slot is 648 nanoseconds in duration.

The digital switching network is a 12-bit wide PCM highway. Each PCM data sample, transmitted via the PCM highway, includes seven bits of speaker voice magnitude information (PCM 0–6), a 1-bit sign (PCM 7) of speaker voice, three bits of supervisory information and an odd parity bit over the eleven bits of the PCM highway.

Figure 2:
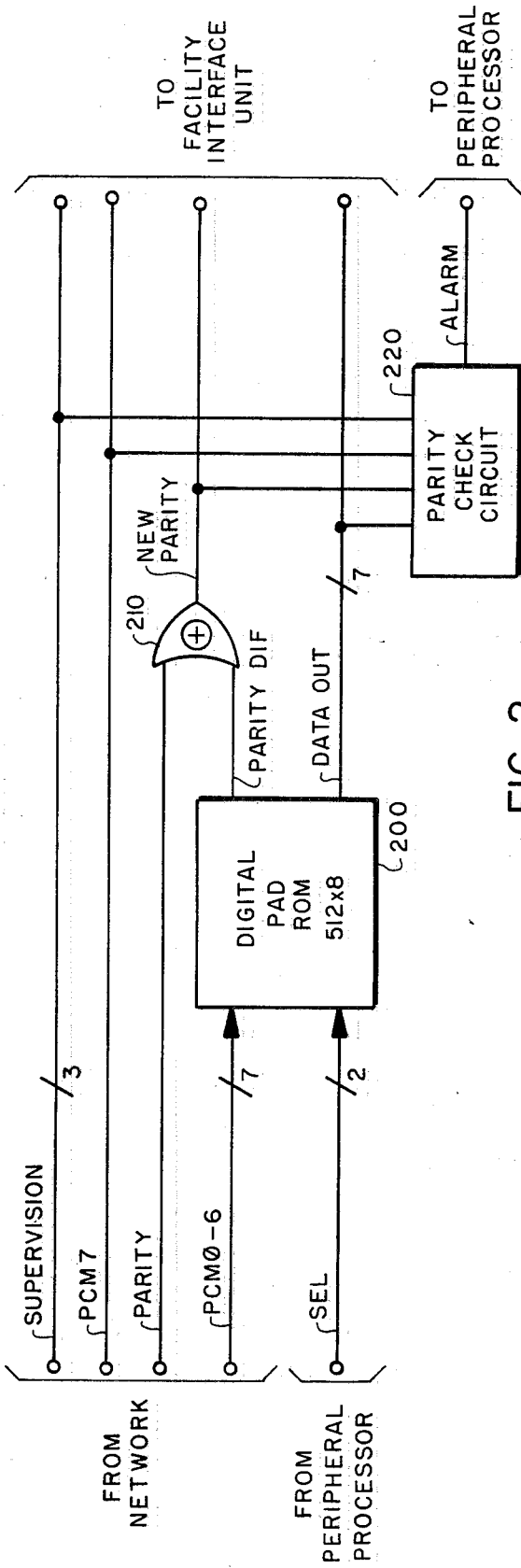
FIG. 2 is a schematic diagram of failure detection apparatus for use with digital pads in accordance with the present invention.

Referring to FIG. 2, a schematic diagram of the digital pad 50 of FIG. 1 is shown. The digital pad ROM 200 is connected between the buffers (not shown) of the terminating time switch and buffers (not shown) of the particular FIU to which the PCM data is being transmitted. The digital pad ROM 200 is a read only memory. This memory is implemented using a pre-programmed 512×8 read only memory integrated circuit, such as the HARRIS HMI-7641-5.

The 12-bit PCM highway is segregated, so that, the seven magnitude bits of each PCM data sample (PCM 0-6) are transmitted to digital pad ROM 200. The parity bit is transmitted to gate 210. The remaining four bits (3-bit supervision and sign bit) are transmitted directly to the facility interface unit. The seven magnitude bits of the PCM data sample are transmitted to the ROM 200 as an address. The peripheral processor is connected to the ROM 200 via the 2-bit SEL bus. The 2-bit SEL bus is used for addressing the ROM and provides the peripheral processor with the ability to select one of four insertion losses for each data sample. The binary coding of the SEL bus provides for up to four attenuation factors. These factors are 0 (no attenuation), 3, 5 or 6 dB loss. The application of these attenuation factors is selected by the operating software of the peripheral processor 80.

Each memory location of ROM 200 contains a modulated 7-bit magnitude value representing the attenuated magnitude of the PCM data sample input. In addition, each attenuated value contains another bit which is a parity bit. This parity bit is not parity over the other seven bits, but is the difference in parity between the input PCM data sample from the network and the modulated magnitude PCM sample to be output from the ROM 200. The seven data bits are output from ROM 200 via the data OUT bus. The parity bit is transmitted via the PARITY DIF lead to EXCLUSIVE-OR gate 210. The original parity bit, over the PCM data sample from the network, is also transmitted via the PARITY lead to EXCLUSIVE-OR gate 210. The PARITY and PARITY DIF signals are combined by EXCLUSIVE-OR gate 210 to produce a NEW PARITY signal which will be the corresponding proper odd parity over the attenuated voice sample including the sign bit and supervisory bits.

The modified 12-bit parallel PCM sample includes three supervision bits transmitted via the SUPERVISION bus, a sign bit transmitted via the PCM 7 lead, a parity bit transmitted via the NEW PARITY lead and the modulated magnitude bits transmitted via the DATA OUT bus. These bits are transmitted to the appropriate facility interface unit. However, the modified 12-bit PCM data sample is also transmitted to parity check circuit 220. Parity check circuit 220 is connected to the SUPERVISION bus, the PCM 7 lead, the NEW PARITY lead and the DATA OUT bus. Parity check circuit 220 calculates odd parity over all of the bits of the modified PCM data sample, except a new parity bit. Parity check circuit then compares the NEW PARITY bit with the parity bit it has calculated. For a miscomparison condition, parity check circuit 220 will transmit a signal indicating a failure to its associated peripheral processor 80 via the ALARM lead, which is connected to the peripheral processor 80.

Any stuck address or any stuck data bits may result in a parity miscomparison. The peripheral processor 80 processes these detected faults. A second fault on the same particular address or a number of consecutive data faults may result in the reconfiguration of the switching network to the duplicate copy of the pair and will initiate a print-out of the failure.

In addition, the network has the ability to transmit test PCM data samples which have bad parity. These bad parity test samples will be detected by parity check circuit 220. As a result, the ALARM signal will be transmitted to the peripheral processor 80.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a digital switching system including a digital switching network for transmitting PCM data samples through said switching network between subscriber interface equipments via digital pads, failure detection apparatus for use with said digital pads comprising:

said digital switching network connected between said subscriber interface equipments via said digital pads said digital switching network being operated to transmit pluralities of said PCM samples between subscribers connected to said subscriber interface equipments;

each of said PCM data samples including a first plurality of data bits representing a magnitude value of said data samples, a second plurality of data bits and a first data parity bit representing parity over said first and second pluralities of data bits;

means for storing connected between said network and said subscriber interface equipment, said means for storing being operated in response to said first plurality of bits of each said PCM data sample to produce a corresponding modulated magnitude value of each said PCM data sample for transmission to said subscriber interface equipment;

said means for storing including parity generator means connected to said network and to said subscriber interface equipment, said parity generator means being operated to transmit a selected one of a stored plurality of second data parity bits representing the difference of parity between said magnitude value of each said PCM sample and said corresponding modulated magnitude value;

gating means connected to said network and to said parity generator means, said gating means being operated in response to said first and second data parity bits to produce a third data parity bit over said PCM data sample including said modulated magnitude value and said second plurality of bits;

parity checking means connected to said network, to said subscriber interface equipment, to said means for storing, and to said gating means, said parity checking being operated to calculate correct data parity over each said PCM data sample including said modulated magnitude value and said second plurality of bits, said parity checking means being further operated to compare said calculated correct data parity with said third data parity bit and to produce a first signal for a miscomparison of said bits indicating a failure of said digital pads;

processor means connected to said digital switching network, to said parity generator means and to said parity checking means, said processor means being operated to receive said first signal indicating said miscomparison and to reconfigure said digital switching network in response to a predetermined number of said miscomparisons;

said means for storing further including programmable read only memory means connected to said network, said programmable read only memory means containing a plurality of modulated magnitude values corresponding to each said PCM data sample transmitted by said digital switching network;

said processor means further including a plurality of connections to said programmable read only memory means; and said programmable read only memory means being operated in response to said processor means to select one of said plurality of modulated magnitude values for each said corresponding PCM data sample.

2. Failure detection apparatus as claimed in claim 1, wherein aid gating means includes EXCLUSIVE-OR gating means connected to said network and to said parity generator means, said EXCLUSIVE-OR gating means being operated in response to said first and second parity bits to produce said third parity bit over said PCM data sample including said modulated magnitude value.

3. Failure detection apparatus as claimed in claim 1, said parity checking means being further operated to transmit said first signal, indicating a failure of said digital pads, to said processor means.

* * * * *